United States Patent
Suzuki et al.

(10) Patent No.: US 8,928,177 B2
(45) Date of Patent: Jan. 6, 2015

(54) CONTROL CIRCUIT AND ELECTRONIC DEVICE

(75) Inventors: Tomohiro Suzuki, Kasugai (JP); Masahiro Natsume, Kasugai (JP)

(73) Assignee: Spansion LLC, Sunnyvale, CA (US)

( * ) Notice: Subject to any disclaimer, the term of this patent is extended or adjusted under 35 U.S.C. 154(b) by 970 days.

(21) Appl. No.: 13/035,485

(22) Filed: Feb. 25, 2011

(65) Prior Publication Data
US 2011/0234195 A1 Sep. 29, 2011

(30) Foreign Application Priority Data
Mar. 24, 2010 (JP) .................................. 2010-67478

(51) Int. Cl.
| | |
|---|---|
| H02J 1/00 | (2006.01) |
| H02J 3/00 | (2006.01) |
| G05F 3/04 | (2006.01) |
| H03D 3/00 | (2006.01) |
| H02M 3/07 | (2006.01) |

(52) U.S. Cl.
CPC ...................................... *H02M 3/07* (2013.01)
USPC ................................ 307/85; 323/311; 327/40

(58) Field of Classification Search
None
See application file for complete search history.

(56) References Cited

U.S. PATENT DOCUMENTS

| | | | |
|---|---|---|---|
| 5,404,379 A * | 4/1995 | Shyue et al. .................. | 375/354 |
| 7,714,549 B2 | 5/2010 | Takemura | |
| 7,872,457 B2 | 1/2011 | Takemura | |
| 2008/0265857 A1 | 10/2008 | Tabaian et al. | |
| 2009/0051335 A1 | 2/2009 | Huang | |

FOREIGN PATENT DOCUMENTS

WO   WO-2006/046372   5/2006

* cited by examiner

*Primary Examiner* — Jared Fureman
*Assistant Examiner* — Aqeel Bukhari
(74) *Attorney, Agent, or Firm* — Sterne, Kessler, Goldstein & Fox P.L.L.C.

(57) ABSTRACT

A controller includes a difference detector that detects a difference between a switching timing of a first channel of a switching power supply including a plurality of channels, and a switching timing of a second channel of the switching power supply, the plurality of channels being coupled in common to an input power supply and performing switching operations in response to clock signals, and a timing adjuster that, based on a detection result of the difference detector, increases a difference between a timing of a clock signal supplied to the first channel and a timing of a clock signal supplied to the second channel when the difference between the switching timing of the first channel and the switching timing of the second channel is smaller than a first value.

20 Claims, 15 Drawing Sheets

FIG. 11

| DIFFERENCE Δt | OUTPUT OF DIFFERENCE DETECTION CIRCUIT 41 | OUTPUT OF DIFFERENCE DETECTION CIRCUIT 42 | INPUT TO SELECTOR 3 |
|---|---|---|---|
| INITIAL STATE | H | L | L |
| EQUAL TO OR SMALLER THAN limΔt | L | H | H |
| INTERMEDIATE VALUE | H | H | HOLD |
| EQUAL TO OR LARGER THAN 3×limΔt | H | L | L |

US 8,928,177 B2

CONTROL CIRCUIT AND ELECTRONIC DEVICE

CROSS-REFERENCE TO RELATED APPLICATION

This application is based upon and claims the benefit of priorities of the prior Japanese Patent Application No. 2010-067478, filed on Mar. 24, 2010, the entire contents of which are incorporated herein by reference.

FIELD

The embodiment discussed herein is related to a control circuit and an electronic device that adjust switching timings of channels of a switching power supply.

BACKGROUND

In general, a switching power supply is used to supply power to a load in an electronic device or the like. For example, a direct-current-to-direct-current (DC-DC) converter that converts a DC voltage into another DC voltage is used. A power supply integrated circuit (IC) that includes a plurality of DC-DC converters and may supply different output voltages from channels is known. When switching timings of channels adjacent to each other become close in the power supply IC including the plurality of DC-DC converters, input current may momentarily increase. The momentary increase of the input current may produce switching noise. For example, WO 2006/046372 A1 discusses a configuration in which ON periods of switching signals of adjacent channels are shifted so as not to overlap.

When a plurality of DC-DC converters to which an input voltage is applied in common include a DC-DC converter in which a switching timing depends on a factor other than a clock signal, and when switching timings of the DC-DC converters become close, switching noise may occur.

SUMMARY

According to an aspect of the embodiment, a controller includes a difference detector that detects a difference between a switching timing of a first channel of a switching power supply including a plurality of channels, and a switching timing of a second channel of the switching power supply, the plurality of channels being coupled in common to an input power supply and performing switching operations in response to clock signals, and a timing adjuster that, based on a detection result of the difference detector, increases a difference between a timing of a clock signal supplied to the first channel and a timing of a clock signal supplied to the second channel when the difference between the switching timing of the first channel and the switching timing of the second channel is smaller than a first value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates logics of difference detection circuits in FIG. 10.

DESCRIPTION OF EMBODIMENT

Figure 1:
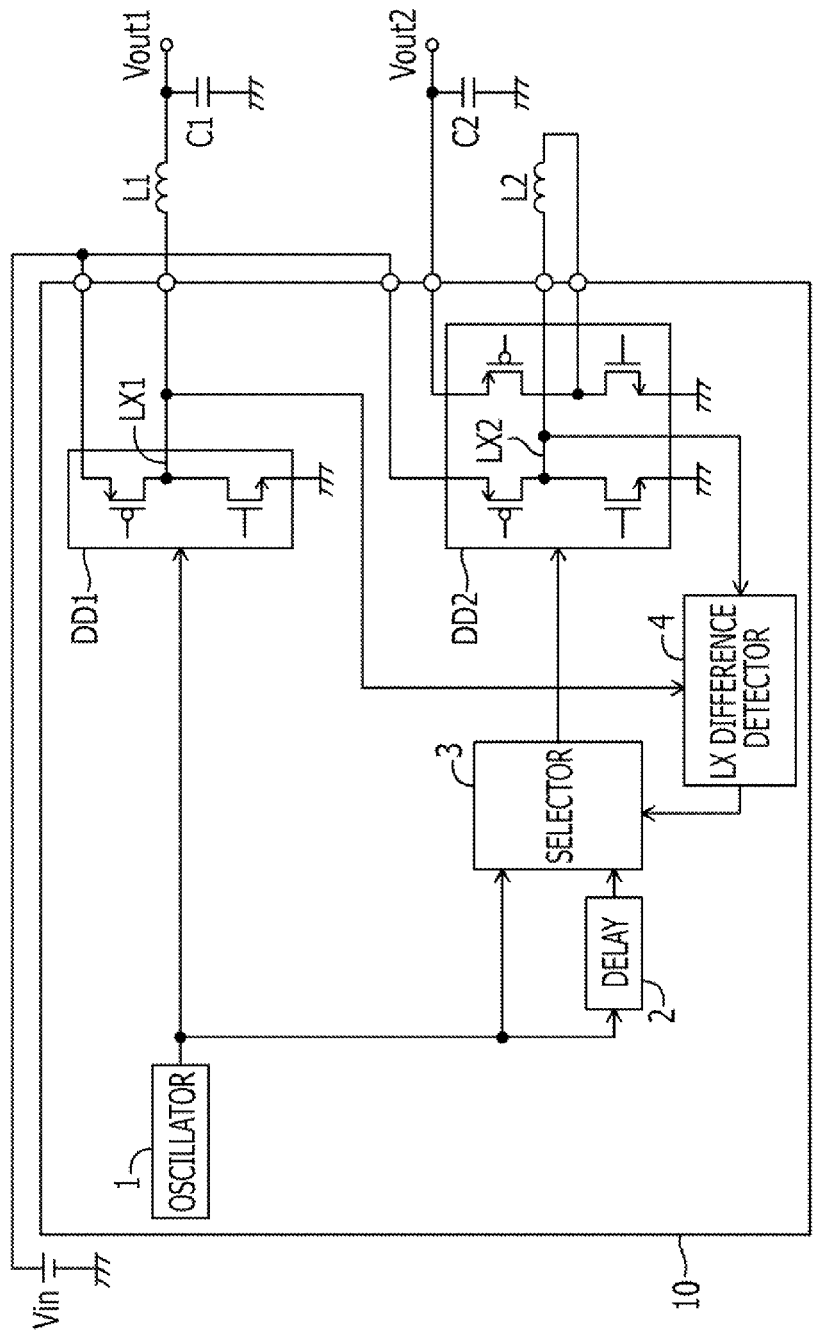
FIG. 1 illustrates an embodiment.

FIG. 1 illustrates a power supply integrated circuit (IC) 10. The IC 10 includes direct-current-to-direct-current (DC-DC) converters DD1 and DD2 that are coupled in common to an input power supply (an input voltage Vin). An oscillator 1 is an oscillation circuit that generates a clock signal with a certain cycle based on application of power to the power supply IC 10. The DC-DC converters DD1 and DD2 perform switching operations in response to a clock signal supplied from the oscillator 1. The clock signal may be generated based on an oscillation signal from a quartz oscillator instead of being supplied from the oscillator 1.

Figure 2:
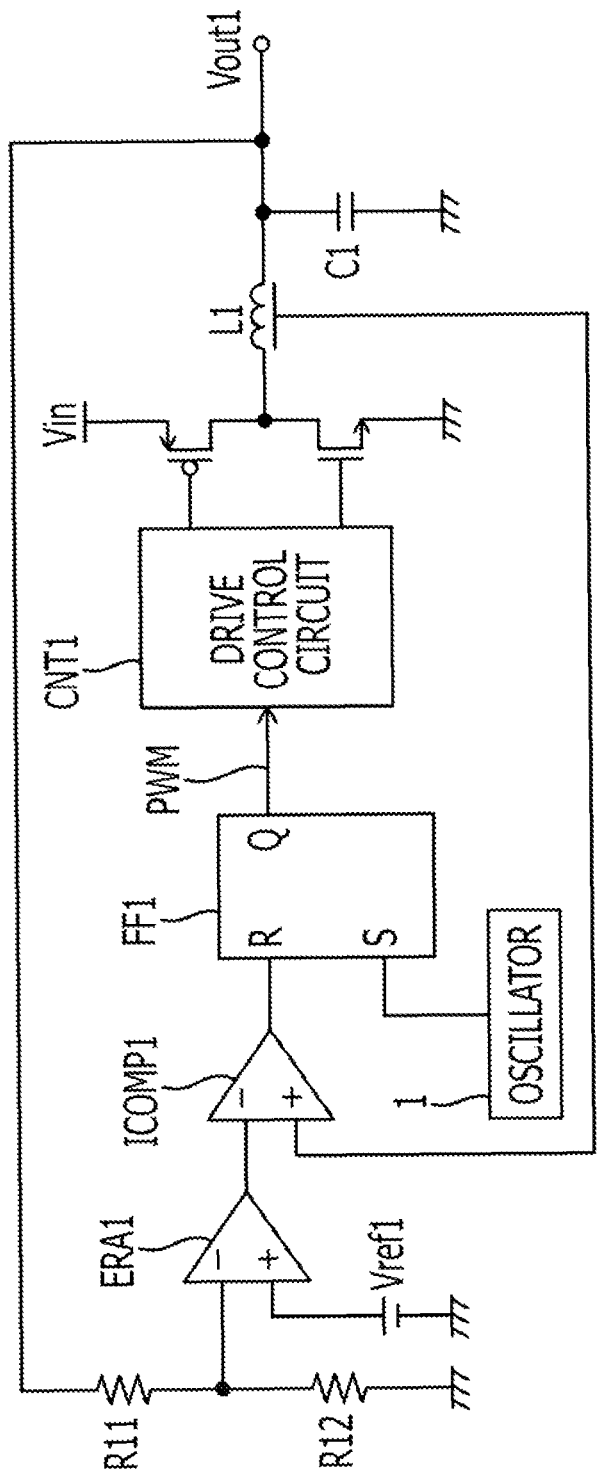
FIG. 2 illustrates a DC-DC converter in FIG. 1.

For example, the DC-DC converter DD1 may be a step-down DC-DC converter illustrated in FIG. 2. A p-channel metal oxide silicon field effect transistor (MOSFET) included in the DC-DC converter DD1 in FIG. 1, which operates as a switching element, corresponds to the p-channel MOSFET in FIG. 2 and is coupled between the input voltage Vin and an output coil L1. An n-channel MOSFET included in the DC-DC converter DD1 in FIG. 1, which operates as a synchronous rectifying element, corresponds to the n-channel MOSFET in FIG. 2 and is coupled between a ground and the output coil L1. An error amplifier ERA1 amplifies a difference between a reference voltage Vref1 and a feedback voltage that is obtained by dividing an output voltage Vout1 using resistors R11 and R12. A comparator ICOMP1 compares a sense voltage signal corresponding to detected current flowing through the output coil L1, on which slope compensation is performed when desired, with an output signal of the error amplifier ERA1. When a clock signal is input from the oscillator 1 to a set terminal S of an RS flip flop FF1 and an output signal of the comparator ICOMP1 is input to a reset terminal R of the RS flip flop FF1, the RS flip flop FF1 generates a pulse width modulation (PWM) signal. The PWM signal is a signal for modulating each ON/OFF period of a switching element and a synchronous rectifying element within a certain cycle so that an output voltage may approach a set voltage. When a drive control circuit CNT1 alternately turns on or off the switching element and the synchronous rectifying element based on the PWM signal, current flows through the output coil L1 via the switching element or the synchronous rectifying element. An output capacitor C1 smoothens the output voltage Vout1 in cooperation with the output coil L1. As a result, the input voltage Vin supplied from the input power supply is stepped down and the output voltage Vout1 is generated.

Figure 3:
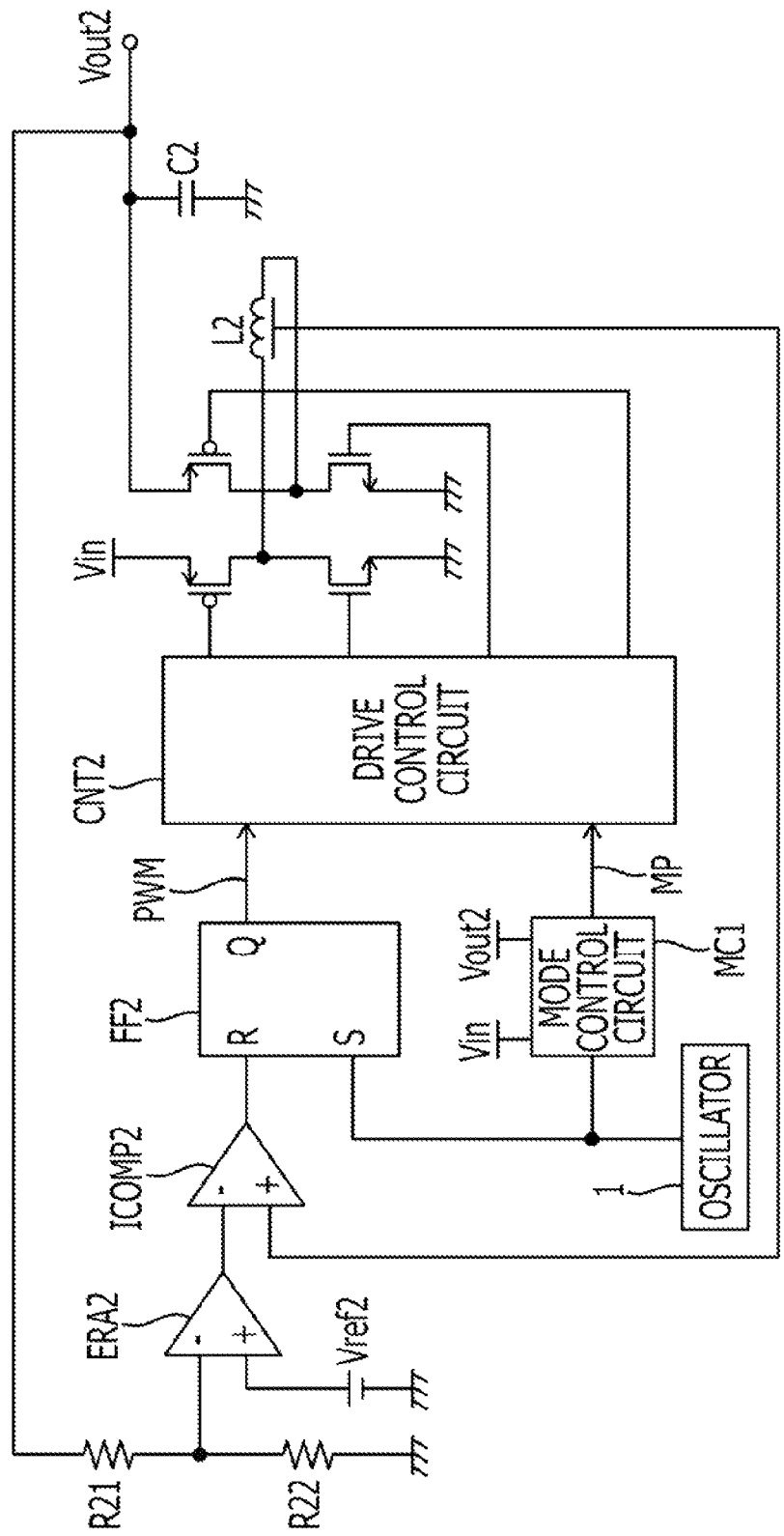
FIG. 3 illustrates another DC-DC converter in FIG. 1.

For example, a DC-DC converter DD2 may be a step-up DC-DC converter illustrated in FIG. 3. A p-channel MOSFET included in the DC-DC converter DD2 in FIG. 1, which operates as a switching element for step-down operations, corresponds to the p-channel MOSFET in FIG. 3, which is coupled between the input voltage Vin and an end of an output coil L2. An n-channel MOSFET included in the DC-DC converter DD2 in FIG. 1, which operates as a synchronous rectifying element for step-down operations, corresponds to the n-channel MOSFET coupled between the ground and the end of the output coil L2 as illustrated in FIG. 3. Another n-channel MOSFET included in the DC-DC converter DD2 in FIG. 1, which operates as a switching element for step-up operations, corresponds to the n-channel MOSFET in FIG. 3, which is coupled between the ground and the other end of the output coil L2. Another p-channel MOSFET included in the DC-DC converter DD2 in FIG. 1, which operates as a synchronous rectifying element for step-up operations, corresponds to the p-channel MOSFET in FIG. 3, which is coupled between an output voltage Vout2 and the other end of the output coil L2. An error amplifier ERA2 amplifies a difference between a reference voltage Vref2 and a feedback voltage that is obtained by dividing the output voltage Vout2 using resistors R21 and R22. A comparator ICOMP2 compares a sense voltage signal corresponding to detected current flowing through the output coil L2, on which slope compensation is performed when desired, with an output signal of the error amplifier ERA2. When a clock signal is input from the oscillator 1 to a set terminal S of the RS flip flop FF2 and an output signal of the comparator ICOMP2 is input to a reset terminal R of the RS flip flop FF2, the RS flip flop FF2 generates a PWM signal. When a mode control circuit MC1 receives a clock signal from the oscillator 1, and receives the input voltage Vin and the output voltage Vout2, the mode control circuit MC1 generates a mode pulse MP. A drive control circuit CNT2 turns on or off the switching element for the step-down operations, the switching element for the step-up operations, the synchronous rectifying element for the step-down operations, and the synchronous rectifying element for the step-up operations based on the PWM signal and the mode pulse MP that is an internal signal.

Figure 4:
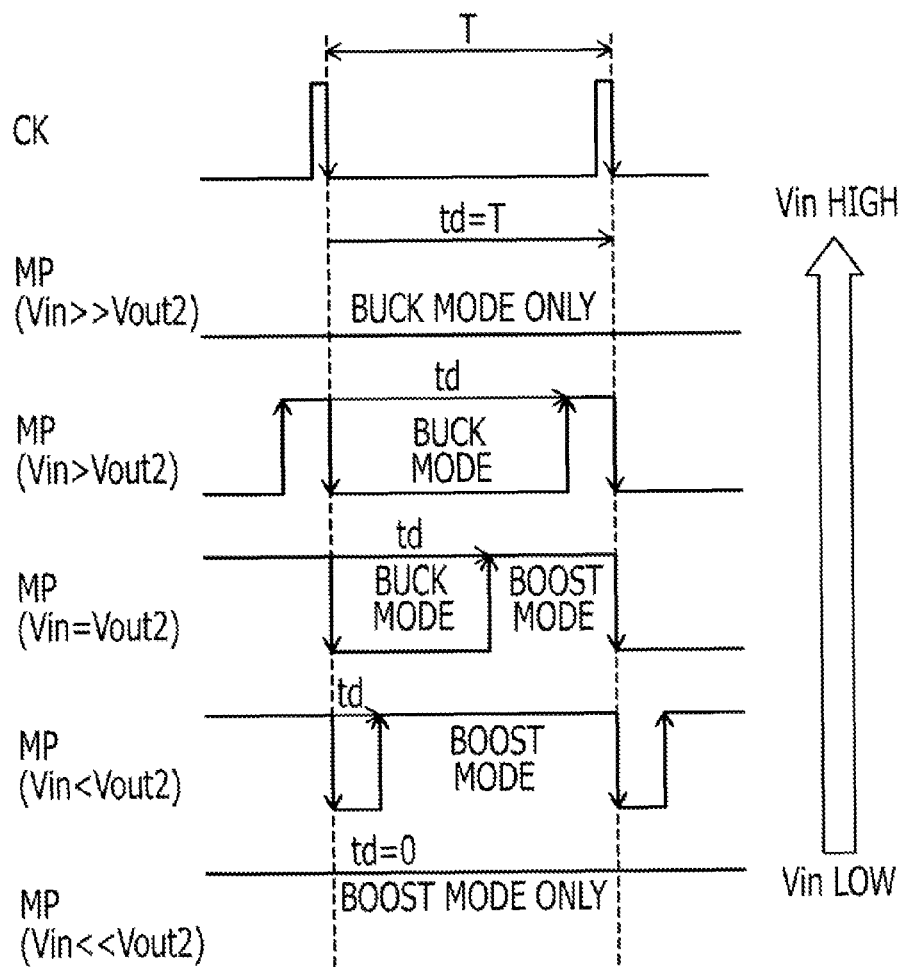
FIG. 4 illustrates operations of a mode pulse of the DC-DC converter in FIG. 3.

FIG. 4 illustrates waveform diagrams of operations of the mode pulse MP in FIG. 3. The DC-DC converter DD2 enters a buck mode for the step-down operations when the mode pulse MP is at the low level (hereinafter referred to as "'L' level," and enters a boost mode for the step-up operations when the mode pulse MP is at the high level (hereinafter referred to as "'H' level"). As illustrated in FIG. 4, a rising timing of the mode pulse MP is delayed by a delay time td that may be set based on the clock signal CK. The delay time td depends on the difference between an input voltage and an output voltage, and the length of the delay time td changes from zero to a value corresponding to the length of the clock cycle T.

Figure 5:
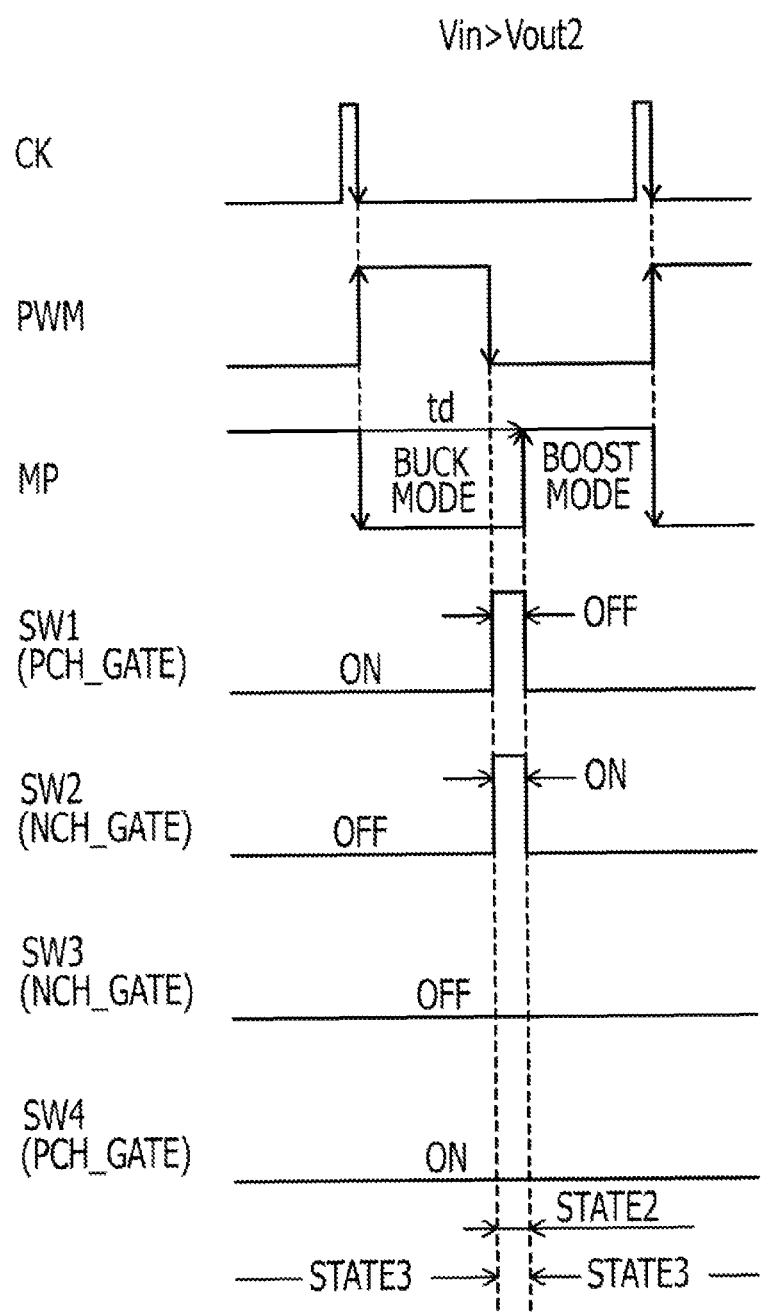
FIG. 5 illustrates timing diagrams of signals of the DC-DC converter in FIG. 3, which are obtained when an input voltage is higher than an output voltage (Vin>Vout2)
Figure 6:
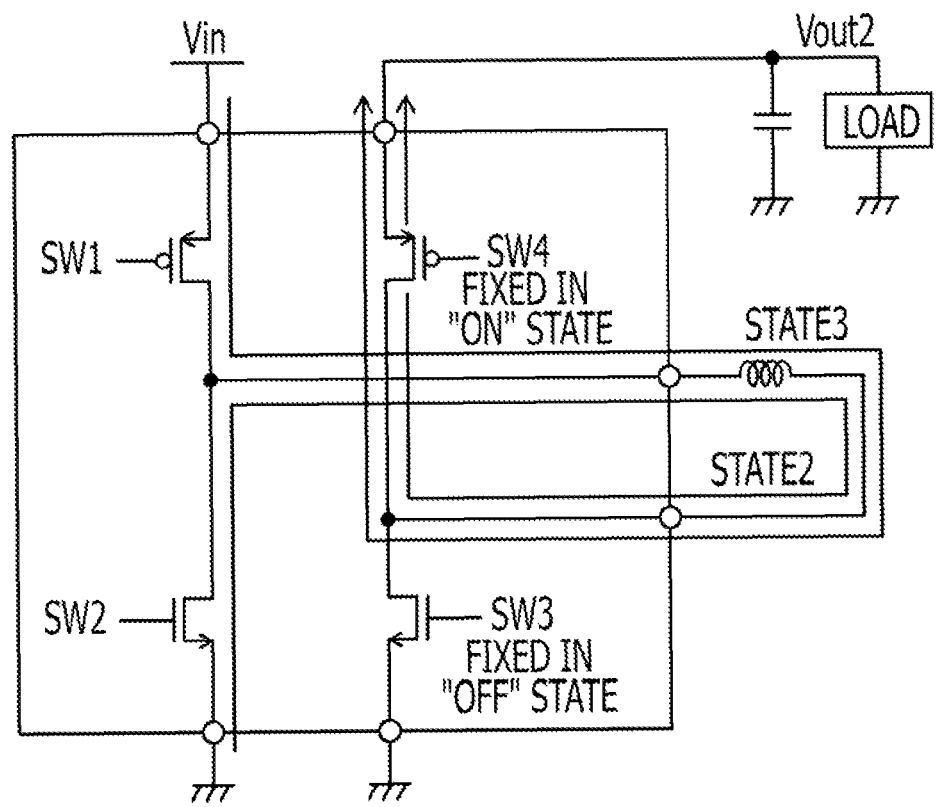
FIG. 6 illustrates operations performed at a power stage of the DC-DC converter in FIG. 3 when the input voltage is higher than the output voltage (Vin>Vout2)
Figure 7:
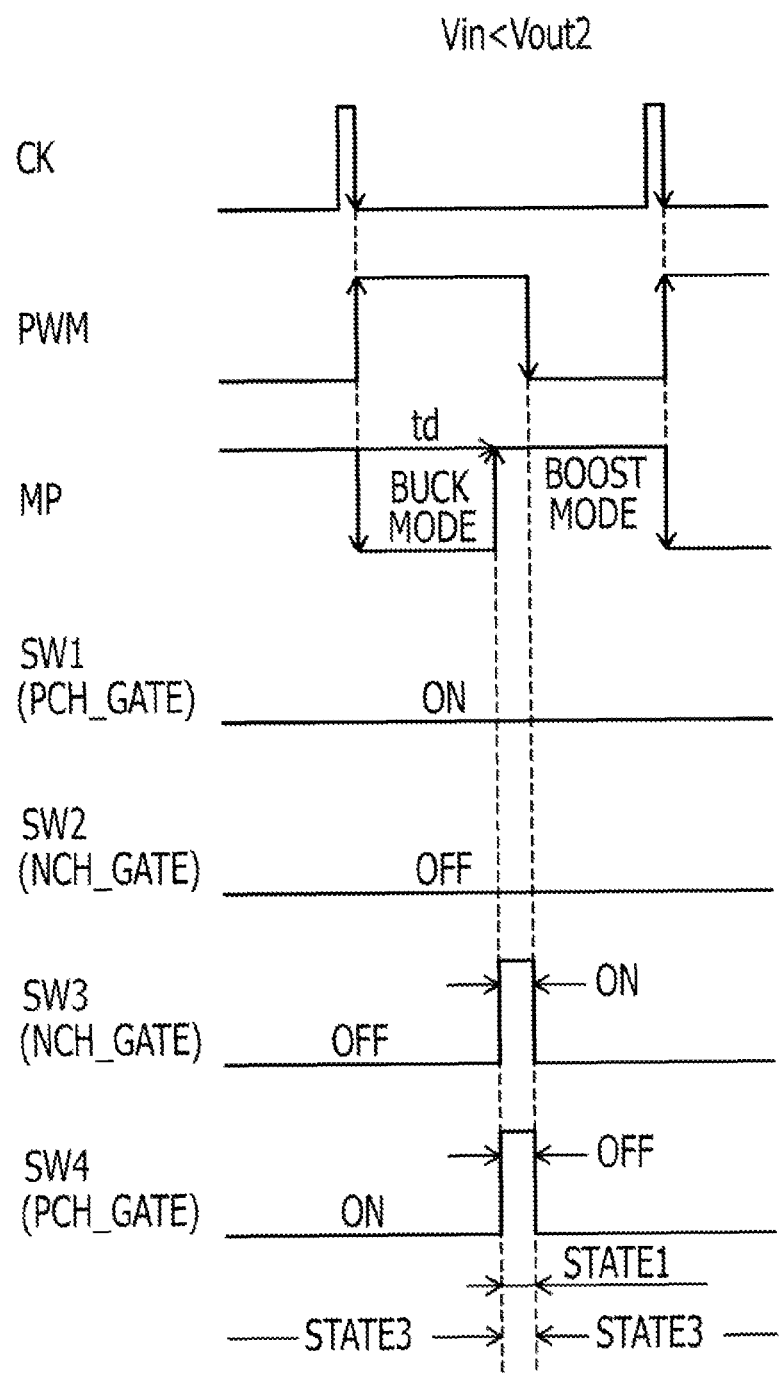
FIG. 7 illustrates timing diagrams of the signals of the DC-DC converter in FIG. 3, which are obtained when the input voltage is lower than the output voltage (Vin<Vout2)
Figure 8:
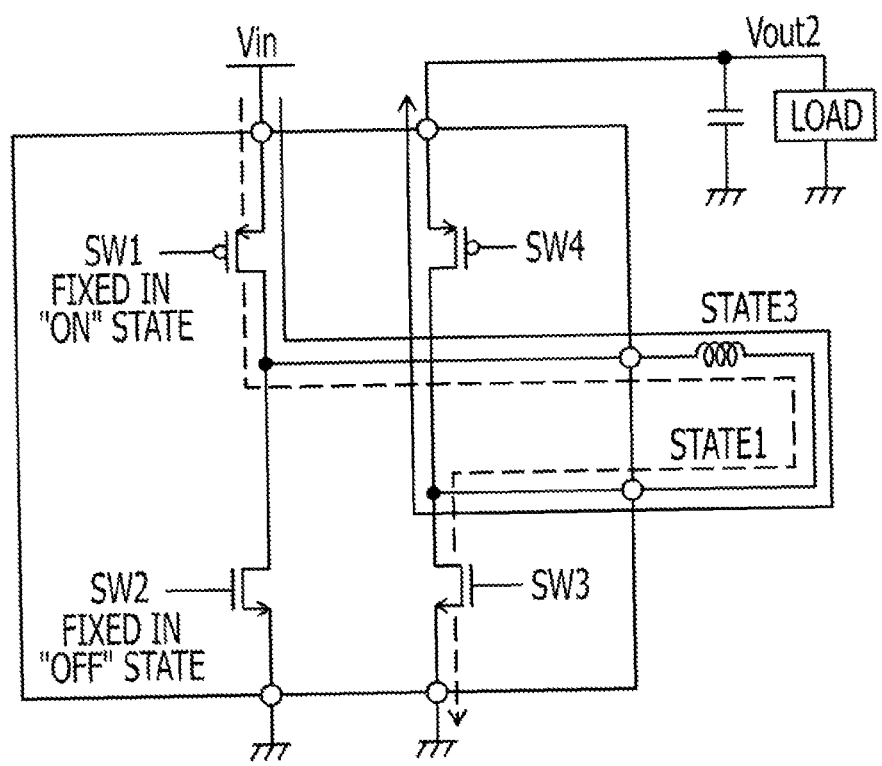
FIG. 8 illustrates operations performed at the power stage of the DC-DC converter in FIG. 3 when the input voltage is lower than the output voltage (Vin<Vout2)

FIG. 5 illustrates timing diagrams of signals of the DC-DC converter DD2 when the input voltage Vin is higher than the output voltage Vout2 (Vin>Vout2). FIG. 6 illustrates operations performed at a power stage of the DC-DC converter DD2 when the input voltage Vin is higher than the output voltage Vout2 (Vin>Vout2). FIG. 7 illustrates timing diagrams of the signals of the DC-DC converter DD2, which are obtained when the input voltage Vin is lower than the output voltage Vout2 (Vin<Vout2). FIG. 8 illustrates operations performed at the power stage of the DC-DC converter DD2 when the input voltage Vin is lower than the output voltage Vout2 (Vin<Vout2). As illustrated in FIGS. 5 and 7, the PWM signal rises and the mode pulse MP falls in synchronization with the clock signal CK. When the mode pulse MP is at the "L" level and the PWM signal is at the "H" level, the power stage of the DC-DC converter DD2 is in State 3. When the mode pulse MP is at the "L" level and the PWM signal is at the "L" level, the power stage of the DC-DC converter DD2 is in State 2. When the mode pulse MP is at the "H" level and the PWM signal is at the "H" level, the power stage of the DC-DC converter DD2 is in State 1. When the mode pulse MP is at the "H" level and the PWM signal is at the "L" level, the power stage of the DC-DC converter DD2 is in State 3.

As illustrated in FIG. 5, when the input voltage Vin is higher than the output voltage Vout2, the PWM signal falls before the delay time td elapses. As a result, the power stage of the DC-DC converter DD2 is controlled in States 2 and 3. Accordingly, as illustrated in FIG. 6, a switching element SW3 for the step-up operations is fixed in the "OFF" state, a synchronous rectifying element SW4 for the step-up operations is fixed in the "ON" state, and the step-down operations are performed at the power stage of the DC-DC converter DD2. As illustrated in FIG. 7, when the input voltage Vin is lower than the output voltage Vout2, the PWM signal falls after the delay time td elapses. As a result, the power stage of the DC-DC converter DD2 is controlled in States 1 and 3. Accordingly, as illustrated in FIG. 8, a switching element SW1 for the step-down operations is fixed in the "ON" state, a synchronous rectifying element SW2 for the step-down operations is fixed in the "OFF" state, and the step-up operations are performed at the power stage of the DC-DC converter DD2.

Thus, the switching element SW1 for the step-down operations, the synchronous rectifying element SW2 for the step-down operations, the switching element SW3 for the step-up operations, and the synchronous rectifying element SW4 for the step-up operations are turned on or off in the DC-DC converter DD2 based on the PWM signal and the mode pulse MP. Accordingly, current flows through the output coil L2. An output capacitor C2 smoothens the output voltage Vout2. As a result, the input voltage Vin supplied from the input power supply is stepped down or stepped up, and the output voltage Vout2 is generated.

Figure 9:
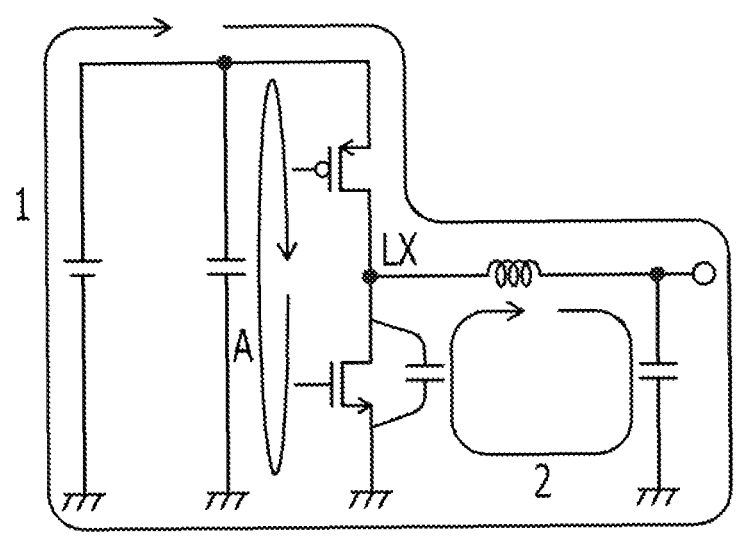
FIG. 9 illustrates inrush current that occurs when switching is performed.

Referring to FIG. 9, inrush current that occurs when switching is performed is described below using a step-down DC-DC converter as an example. As described above, a switching element (in this example, a p-channel MOSFET) and a synchronous rectifying element (in this example, an n-channel MOSFET) are alternately turned on or off in the step-down DC-DC converter based on a PWM signal. As a result, current flows through an output coil via a path 1 or 2, alternately. The voltage of a coupling point LX of the switching element, the synchronous rectifying element, and the output coil changes in accordance with the change in the path via which the current flows.

When the path via which the current flows changes from the path 1 to the path 2, the voltage of the coupling point LX changes from the "H" level to the "L" level. Since, in this case, the voltage of the coupling point LX decreases depending on load current, the change in the current is gradual. When the path via which the current flows changes from the path 2 to the path 1, the voltage of the coupling point LX changes from the "L" level to the "H" level. Since, in this case, the voltage of the coupling point LX abruptly rises, current that charges parasitic capacitance of the synchronous rectifying element flows. As a result, the inrush current flows via a path A as illustrated in FIG. 9. The inrush current becomes high frequency components and causes undesired emission.

Accordingly, it is preferable that potentials of coupling points LX (hereinafter referred to as "LX potentials") of adjacent channels, which may cause noise, rise at timings apart from each other so that undesired emission may be reduced in a power supply IC that includes a plurality of DC-DC converters. When the adjacent channels are made up of a combination of step-down DC-DC converters and/or step-up DC-DC converters, each of the DC-DC converters performs switching based on a PWM signal synchronized with a clock signal. Accordingly, the rising timings of the LX potentials of the adjacent channels may be made apart by shifting phases of the clock signals of the adjacent channels in advance. However, when the adjacent channels are made up of a combination including a step-up and step-down DC-DC converter, a switching timing of the step-up and step-down DC-DC converter depends on a PWM signal and a mode pulse MP. Accordingly, a rising timing of an LX potential of the step-up and step-down DC-DC converter is not synchronized with a clock signal and depends on the difference between an input voltage and an output voltage. Therefore, the rising timings of the LX potentials may not be made different in an overall operation region even when the phases of the clock signals of the adjacent channels are shifted in advance. As described above, when a power supply IC with a plurality of DC-DC converters includes a DC-DC converter in which a switching timing depends on a factor other than a clock signal, such as the difference between an input voltage and an output voltage, the switching timings of the DC-DC converters may be close and noise may occur.

Referring again to FIG. 1, details are described below. In the step-down DC-DC converter DD1, a rising timing of a potential LX1, that is, the timing at which the switching element (the p-channel MOSFET) is turned on, depends on a clock signal from the oscillator 1. In the step-up and step-down DC-DC converter DD2, a rising timing of a potential LX2, that is, the timing at which the switching element (the p-channel MOSFET) for the step-down operations is turned on, depends on the mode pulse MP that is different from the clock signal from the oscillator 1. Even when the phases of the clock signals from the oscillator 1 to the DC-DC converters DD1 and DD2 are shifted in advance to reduce or avoid noise that may occur due to concurrent switching of the DC-DC converters DD1 and DD2, the switching timings may overlap.

As illustrated in FIG. 1, the power supply IC 10 according to the embodiment includes an LX difference detector 4 that monitors the LX potentials of the adjacent channels, that is, the potential LX1 of the DC-DC converter DD1 and the potential LX2 of the DC-DC converter DD2 to detect the difference between the rising timing of the potential LX1 and the rising timing of the potential LX2, and includes a timing adjuster that adjusts the switching timings based on the detection result of the LX difference detector 4. The timing adjuster includes a delay generator 2 and a selector 3, and applies a delay to the clock signal supplied to the DC-DC converter DD2 based on the detection result of the LX difference detector 4. When the rising timings of the potential LX1 of the DC-DC converter DD1 and the potential LX2 of the DC-DC converter DD2 are close, the power supply IC 10 according to the embodiment shifts the clock signal on the side of the DC-DC converter DD2 so that the rising timings of the potentials LX1 and LX2 may be apart. Since the frequency remains unchanged in this case, each DC-DC converter may operate without being affected by the shift.

Figure 10:
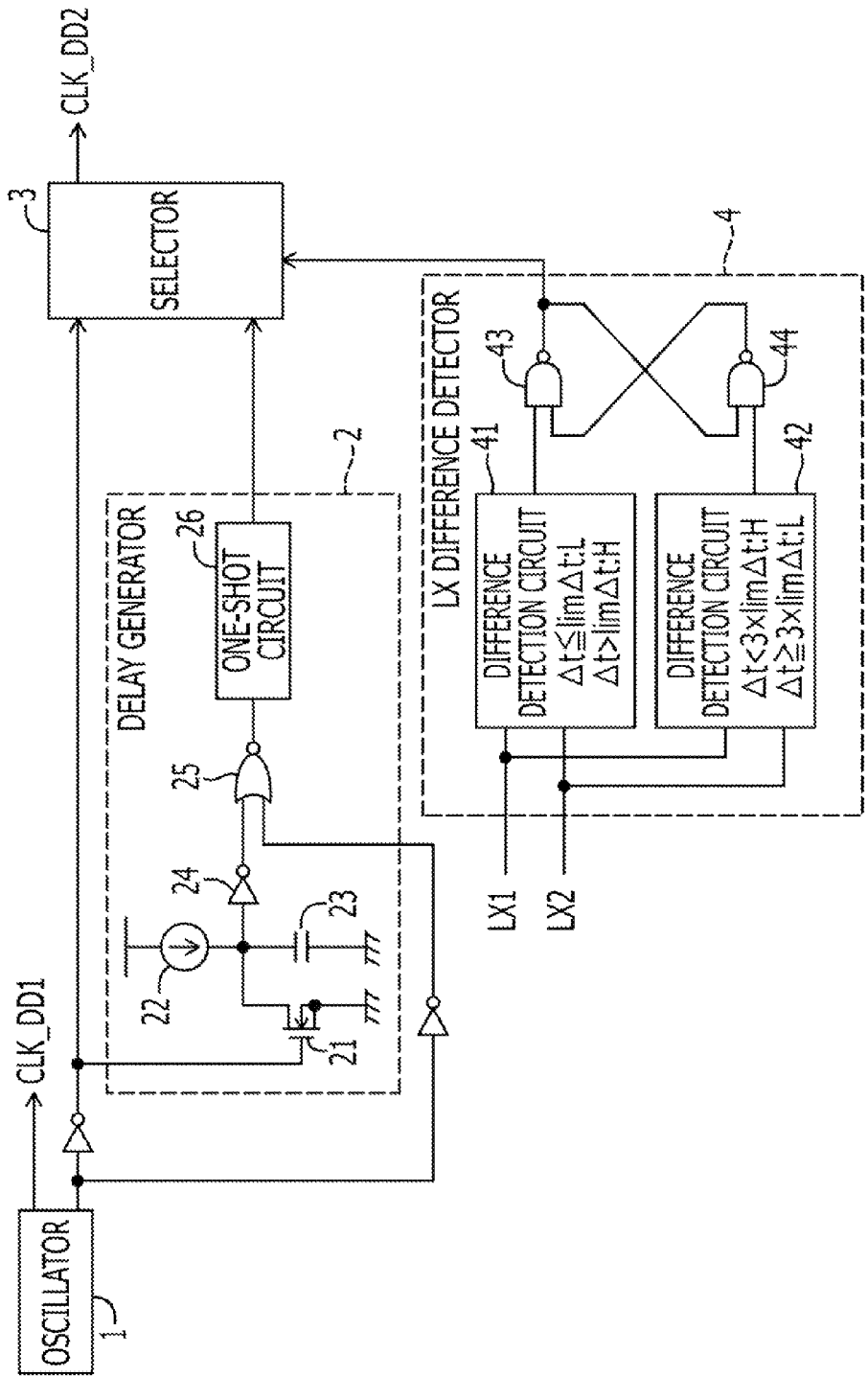
FIG. 10 illustrates an LX difference detector and a delay generator in FIG. 1.

FIG. 10 is a circuit block diagram illustrating the LX difference detector 4 and the delay generator 2. In FIG. 10, the phases of the clock signals supplied to the DC-DC converters DD1 and DD2 are inverse and the DC-DC converters DD1 and DD2 operate based on the clock signals having the inverse phases. An output of the oscillator 1 is supplied to the DC-DC converter DD1 as a clock signal CLK_DD1. Based on the detection result of the LX difference detector 4, the selector 3 selects an inverse-phase signal obtained by inverting another output of the oscillator 1 using an inverter, or a delay signal obtained by applying a delay to the inverse-phase signal using the delay generator 2. Further, the selector 3 supplies the selected signal to the DC-DC converter DD2 as a clock signal CLK_DD2.

As illustrated in FIG. 10, the delay generator 2 includes an n-channel MOSFET 21, a constant current source 22, a capacitor 23, an inverter 24, a NOR gate 25, and a one-shot circuit 26. The inverse-phase signal obtained by inverting the output of the oscillator 1 using the inverter is input to the gate of the n-channel MOSFET 21. The constant current source 22 is coupled to the drain of the n-channel MOSFET 21 and the capacitor 23. The NOR gate 25 receives a voltage of the capacitor 23 input through the inverter 24 and receives another inverse-phase signal obtained by inverting the output of the oscillator 1 using another inverter. An output of the NOR gate 25 is input to the one-shot circuit 26. The one-shot circuit 26 maintains an output at the "H" level for a certain period after the input has reached the "H" level.

The n-channel MOSFET 21 is turned on when the inverse-phase signal, which is obtained by inverting the output of the oscillator 1 using the inverter, reaches the "H" level, and discharges electric charges accumulated in the capacitor 23. When the inverse-phase signal reaches the "L" level and the n-channel MOSFET 21 is turned off, the capacitor 23 starts to be charged by the constant current source 22. When the voltage of the capacitor 23 increases and the inverter 24 determines the "H"-level input, the output of the NOR gate 25 changes from the "L" level to the "H" level. Accordingly, the one-shot circuit 26 supplies an "H"-level output for a certain period. As described above, the delay generator 2 applies a delay that has an amount dependent on the value of the constant current of the constant current source 22 and the capacitance value of the capacitor 23 to the inverse-phase signal obtained by inverting the output of the oscillator 1 using the inverter.

As also illustrated in FIG. 10, the LX difference detector 4 includes difference detection circuits 41 and 42, and NAND gates 43 and 44. The potential LX1 of the DC-DC converter DD1 and the potential LX2 of the DC-DC converter DD2 are input to each of the difference detection circuit 41 and the difference detection circuit 42. Based on a difference $\Delta t$ between the rising timing of the potential LX1 of the DC-DC converter DD1 and the rising timing of the potential LX2 of the DC-DC converter DD2, the difference detection circuits 41 and 42 output logics illustrated in FIG. 11. For example, an output of the difference detection circuit 41 is at the "H" level in an initial state. When the difference $\Delta t$ is equal to or smaller than a first value lim$\Delta t$, the output of the difference detection circuit 41 is at the "L" level. When the difference $\Delta t$ is larger than the first value lim$\Delta t$, the output of the difference detection circuit 41 is at the "H" level. For example, an output of the difference detection circuit 42 is at the "L" level in the initial state. When the difference Δt is smaller than a second value 3×limΔt, the output of the difference detection circuit 42 is at the "H" level. When the difference Δt is equal to or larger than the second value 3×limΔt, the output of the difference detection circuit 42 is at the "L" level.

Referring to FIG. 10, the NAND gates 43 and 44 make up an RS latch that receives the output of the difference detection circuit 41 as a set input and receives the output of the difference detection circuit 42 as a reset input. As illustrated in FIG. 11, in the initial state, the RS latch is reset based on the "H"-level output of the difference detection circuit 41 and the "L"-level output of the difference detection circuit 42. As a result, an input to the selector 3 reaches the "L" level. As also illustrated in FIG. 11, when the difference Δt becomes equal to or smaller than the first value limΔt, the output of the difference detection circuit 41 reaches the "L" level and the output of the difference detection circuit 42 reaches the "H" level. Accordingly, the RS latch is set and the input to the selector 3 reaches the "H" level. When the difference Δt becomes equal to or larger than the second value 3×limΔt, the output of the difference detection circuit 41 reaches the "H" level and the output of the difference detection circuit 42 reaches the "L" level. As a result, the RS latch is reset and the input to the selector 3 reaches the "L" level as illustrated in FIG. 11. When the difference Δt is between the first value limΔt and the second value 3×limΔt, both the output of the difference detection circuit 41 and the output of the difference detection circuit 42 are at the "H" level. Accordingly, the output state of the RS latch remains unchanged and the input to the selector 3 is held in a previous state as illustrated in FIG. 11 as "HOLD."

When the input from the LX difference detector 4 is at the "L" level, the selector 3 according to the embodiment selects the inverse-phase signal obtained by inverting the output of the oscillator 1 using the inverter. Alternatively, when the input from the LX difference detector 4 is at the "H" level, the selector 3 selects the delay signal applied with a delay by the delay generator 2. Accordingly, in the initial state, the inverse-phase signal obtained by inverting the output of the oscillator 1 using the inverter is supplied to the DC-DC converter DD2 as the clock signal CLK_DD2. When the difference Δt between the rising timing of the potential LX1 of the DC-DC converter DD1 and the rising timing of the potential LX2 of the DC-DC converter DD2 is equal to or smaller than the first value limΔt, the delay signal delayed by the delay generator 2 is output as the clock signal CLK_DD2. When the difference Δt becomes equal to or larger than the second value 3×limΔt while the delay signal is supplied, the clock signal CLK_DD2 returns to the signal corresponding to the initial state, that is, the inverse-phase signal.

Figure 12:
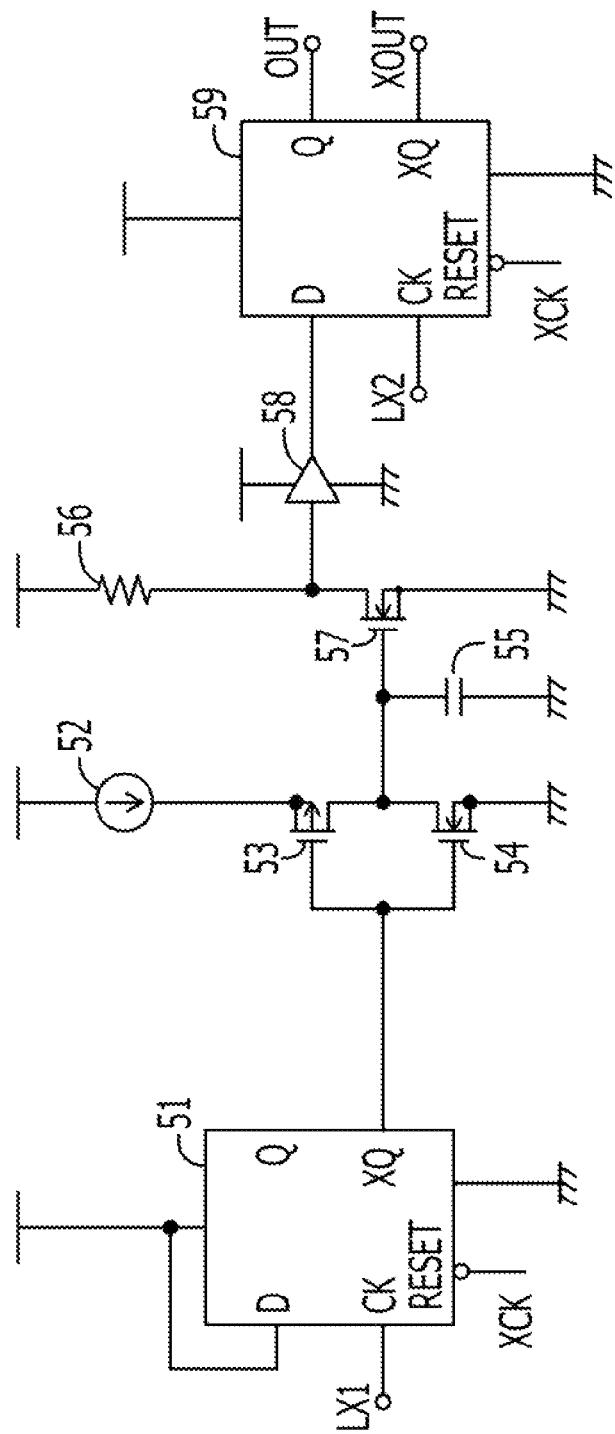
FIG. 12 illustrates the difference detection circuits in FIG. 10.

FIG. 12 is a circuit block diagram illustrating the difference detection circuits 41 and 42. The embodiment is based on a configuration satisfying the following conditions that: each of the DC-DC converter DD1 and the DC-DC converter DD2 is a PWM type DC-DC converter; DC-DC converter DD1 and the DC-DC converter DD2 operate based on clock signals with substantially the same phases; and the second value 3×limΔt remains smaller than a half cycle of the clock signal.

The difference detection circuits 41 and 42 include a flip flop 51, a constant current source 52, a p-channel MOSFET 53, an n-channel MOSFET 54, a capacitor 55, a resistor 56, an n-channel MOSFET 57, an amplifier 58, and a flip flop 59. A terminal D of the flip flop 51 is fixed at the "H" level. A terminal CK of the flip flop 51 receives the potential LX1 of the DC-DC converter DD1. A reset terminal of the flip flop 51 receives an inversion clock signal XCK, which is an inverted signal of the clock signal supplied to the DC-DC converter DD1. A terminal XQ of the flip flop 51, which is an inversion output terminal of the flip flop 51, is coupled to the gate of the p-channel MOSFET 53 and the gate of the n-channel MOSFET 54. The constant current source 52 is coupled to the source of the p-channel MOSFET 53. The capacitor 55 is coupled to a coupling point of the p-channel MOSFET 53 and the n-channel MOSFET 54, and coupled to the gate of the n-channel MOSFET 57. The drain of the n-channel MOSFET 57 is coupled to a power supply line through the resistor 56. A voltage of a coupling point of the resistor 56 and the n-channel MOSFET 57 is input to the amplifier 58. A terminal D of the flip flop 59 is coupled to the amplifier 58, and a terminal CK of the flip flop 59 receives the potential LX2 of the DC-DC converter DD2. Similar to the flip flop 51, a reset terminal of the flip flop 59 receives the inversion clock signal XCK, which is an inverted signal of the clock signal supplied to the DC-DC converter DD1. An output OUT is supplied from a terminal Q of the flip flop 59, and an inversion output XOUT is supplied from a terminal XQ of the flip flop 59.

When the potential LX1 of the DC-DC converter DD1 rises, the output of the terminal XQ of the flip flop 51 reaches the "L" level. Accordingly, the p-channel MOSFET 53 is turned on and the n-channel MOSFET 54 is turned off, and the capacitor 55 starts to be charged by the constant current source 52. When the voltage of the capacitor 55 becomes higher, the n-channel MOSFET 57 is turned on. As a result, the voltage of the coupling point of the resistor 56 and the n-channel MOSFET 57 becomes lower, and the output from the amplifier 58, that is, an input to the terminal D of the flip flop 59 changes from the "H" level to the "L" level. When the potential LX2 of the DC-DC converter DD2 rises, the flip flop 59 latches the input to the terminal D of the flip flop 59.

The changing timing of the input to the terminal D of the flip flop 59 depends on a constant current value of the constant current source 52 and a capacitance value of the capacitor 55. Therefore, the first value limΔt and the second value 3×limΔt may be adjusted based on the constant current value of the constant current source 52 and the capacitance value of the capacitor 55.

Figure 13:
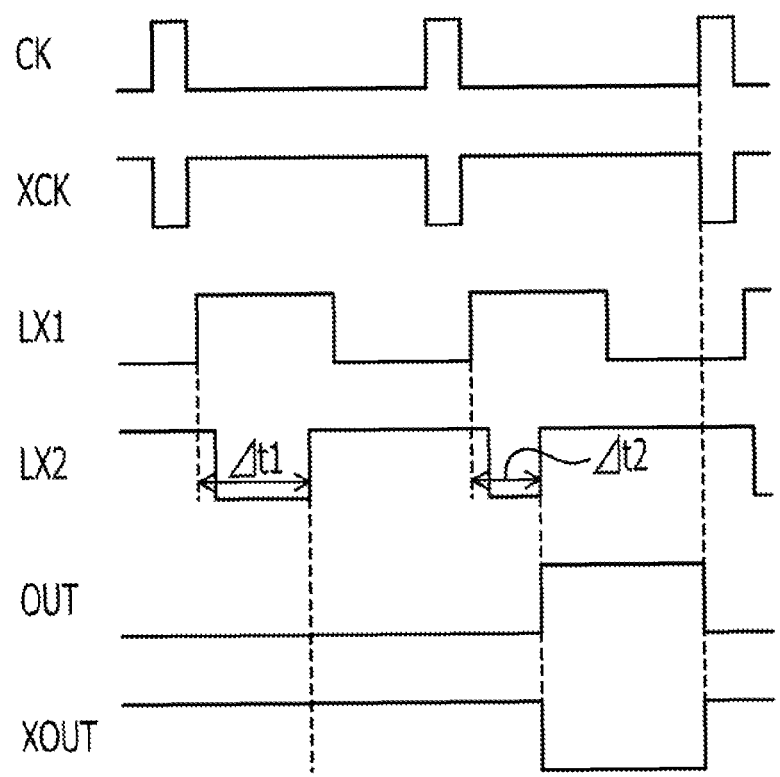
FIG. 13 illustrates timing diagrams of the difference detection circuits in FIG. 10.

FIG. 13 illustrates timing diagrams related to operations of the difference detection circuits 41 and 42 described above. As illustrated in FIG. 13, when a difference Δt1 between the rising timing of the potential LX1 of the DC-DC converter DD1 and the rising timing of the potential LX2 of the DC-DC converter DD2 is larger than the first value limΔt, logics of the output OUT and the inversion output XOUT remain unchanged. When a difference Δt2 is smaller than the first value limΔt, the logics of the output OUT and the inversion output XOUT are inverted. When the flip flops 51 and 59 are reset based on the inversion clock signal XCK, the logics of the output OUT and the inversion output XOUT return to the original state.

Accordingly, the difference detection circuits 41 and 42 may operate as intended when the output OUT and the inversion output XOUT are properly used based on the logics desired by the difference detection circuits 41 and 42 (see FIG. 11).

Figure 14:
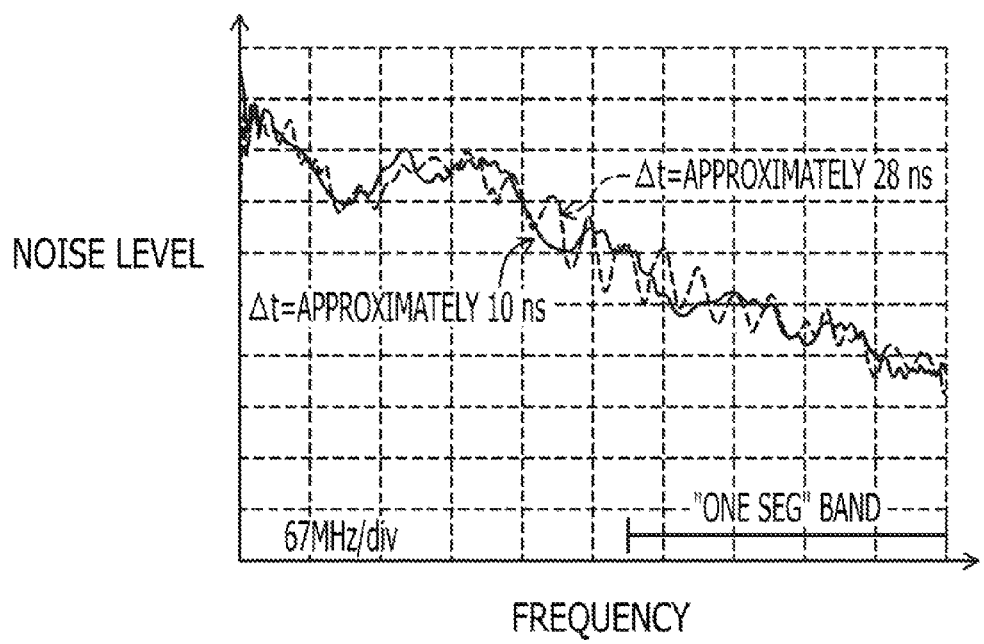
FIG. 14 is a graph according to the embodiment in FIG. 1, illustrating a first relationship between a difference between rising timings of LX potentials, and a noise level.
Figure 15:
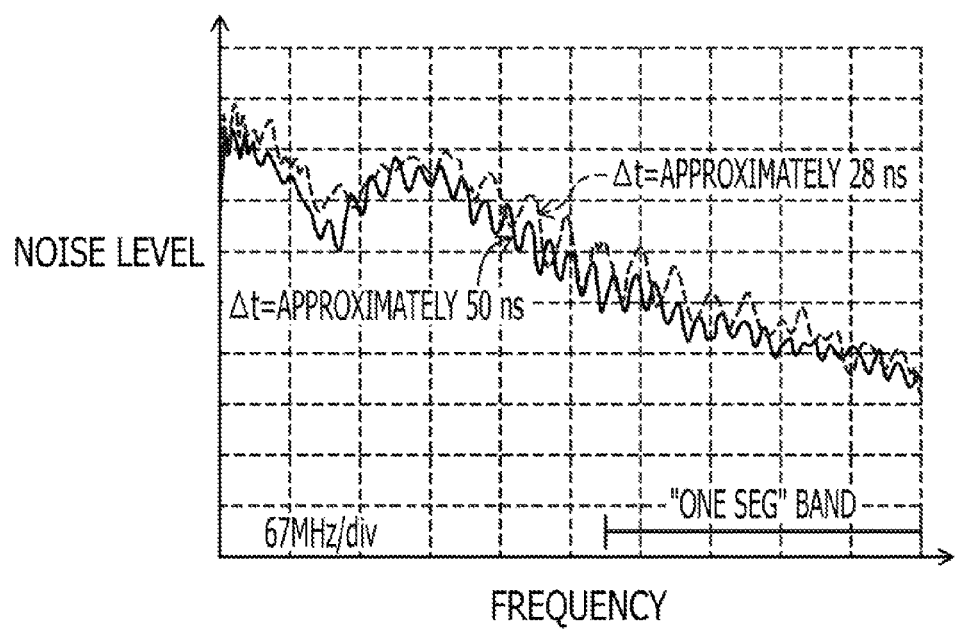
FIG. 15 is another graph according to the embodiment in FIG. 1, illustrating a second relationship between the difference between the rising timings of the LX potentials, and the noise level.

Each of FIGS. 14 and 15 illustrates a relationship between the difference Δt between the rising timings of the potentials LX1 and LX2, and a noise level. FIG. 14 is based on a comparison of actual measurement data obtained when the difference Δt is approximately 10 nsec (indicated with a solid line) and approximately 28 nsec (indicated with a dashed line). FIG. 15 is based on a comparison of actual measurement data obtained when the difference Δt is approximately 28 nsec (indicated with a solid line) and approximately 50 nsec (indicated with a dashed line). As illustrated in FIG. 14, the peaks of the noise level obtained when the difference Δt is approximately 10 nsec and approximately 28 nsec are not greatly different. However, as illustrated in FIG. 15, the peaks of the noise level obtained when the difference Δt is approximately 50 nsec are lower than the peaks of the noise level obtained when the difference Δt is approximately 10 nsec or 28 nsec.

In the power supply IC 10 according to the embodiment, when the LX difference detector 4 detects the difference Δt and the difference Δt becomes smaller than the first value limΔt, the timing adjuster shifts the clock signal of the DC-DC converter DD2 and makes the rising timings of the potentials LX1 and LX2 apart from each other. Accordingly, the peaks of the noise level may be lowered by adjusting the first value limΔt based on the actual measurement data so that the first value limΔt may be 50 nsec for example.

For example, when a system to which power is supplied is a wireless installation in a mobile device and high-frequency components caused by inrush current generated at a switching timing reach the reception band (e.g. band for "One Seg" service), a reception sensitivity and a carrier-to-noise ratio (CN ratio) may be lowered and preferable viewing may be hindered. According to the embodiment, however, undesired emission may be reduced and preferable viewing may not be hindered.

According to the embodiment, when the switching timings are close in the power supply IC 10 that includes the DC-DC converters DD1 and DD2, the clock signal of the DC-DC converter DD2 is caused to shift as described above. When the switching timings are made apart, undesired emission may be reduced. Unlike a case where ON times of channels are controlled so as not to overlap, the rising timings of the LX potentials of the channels, which may cause noise, are controlled to be apart. Therefore, even when an ON duty rate is 50% or more, the control may be performed.

In the configuration according to the embodiment, the LX potentials are directly monitored. Rising timings of LX potentials, which may cause noise, may be influenced by an external component, such as an output coil. Accordingly, when switching timings are shifted while monitoring an internal signal that controls the switching, margin design is desirably performed by taking the influence of the external component into account. When the LX potentials are directly monitored as in the embodiment, however, it may not be desired to take the influence of the external component into account. When the internal signal is utilized, a delay may occur between a timing at which the internal signal changes and a timing at which the switching element is switched. The delay may become more problematic as a switching frequency becomes higher. When an arithmetic circuit is added to obtain a desired accuracy while taking the time difference into account, for example, the circuit may be enlarged. However, since the configuration according to the embodiment, where the LX potentials are directly monitored, may be free of an influence of a circuit delay or the like, the desired accuracy may be obtained with a simple design, and the circuit may not be enlarged.

In addition, according to the embodiment, the LX difference detector 4 includes the difference detection circuits 41 and 42. In the difference detection circuit 41, the first value limΔt is set as a threshold value. In the difference detection circuit 42, the second value 3×limΔt is set as a threshold value. Thus, the threshold values may have hysteresis characteristics and a configuration resistant to noise may be obtained.

For example, the configuration of the DC-DC converter DD1 or DD2 is not limited to the embodiment described above. The DC-DC converter DD1 or DD2 may have a configuration in which the mode pulse MP is monitored instead of the LX potentials. For example, in FIG. 12, the mode pulse MP may be input instead of the potential LX2 to the terminal CK of the flip flop 59. In this case, a delay between an actual switching timing and a changing timing of the internal signal may be caused by an inductance, a capacitance, or the like. Therefore, the timing adjustment may be performed by taking the difference between the switching timing and the changing timing of the internal signal into account.

Instead of shifting the clock signal of the step-up and step-down DC-DC converter DD2, the clock signal of the step-down DC-DC converter DD1 may be shifted. The power supply IC 10 may have three or more channels. The channels where the switching timings are made apart from each other may not necessarily be adjacent channels. When the power supply IC 10 has three or more channels for example, settings may be made easier by referring to the step-down DC-DC converter DD1, where the rising timing of the LX potential (potential LX1) is synchronized with the clock signal, to shift the clock signal of the step-up and step-down DC-DC converter DD2, where the rising timing of the LX potential (potential LX2) changes based on the clock signal.

Further, an electronic device including the above-described power supply IC 10, a battery that supplies the input voltage Vin, and a system that operates based on the output voltages Vout1 and Vout2 may be formed.

The DC-DC converters DD1 and DD2 are examples of a first channel and a second channel, respectively. The LX difference detector 4 is an example of a difference detector. The delay generator 2 and the selector 3 are examples of a timing adjuster. The difference detection circuits 41 and 42 are an example of a first difference detection circuit, and an example of a second difference detection circuit, respectively. The output coils L1 and L2 are an example of a first output coil, and an example of a second output coil, respectively. The values limΔt and 3×limΔt are an example of a first value, and an example of a second value, respectively. The potentials LX1 and LX2 are an example of a potential corresponding to a first coupling point, and an example of a potential corresponding to a second coupling point, respectively. The NAND gates 43 and 44 are examples of a latch circuit. The flip flops 51 and 59 are an example of a first flip flop, and an example of a second flip flop, respectively. The MOSFETs 53, 54, and 57 are an example of a first transistor, an example of a second transistor, and an example of a third transistor, respectively. The mode pulse MP is an example of an internal signal.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although an embodiment of the present invention has been described in detail, it should be understood that the various changes, substitutions, and alterations could be made hereto without departing from the spirit and scope of the invention.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A controller comprising:
   a difference detector that is configured to detect a difference between a switching timing of a first channel of a switching power supply including a plurality of channels, and a switching timing of a second channel of the switching power supply, the plurality of channels being coupled in common to an input power supply and is configured to perform switching operations in response to clock signals; and
   a timing adjuster that is configured to increase a difference between a timing of a clock signal supplied to the first channel and a timing of a clock signal supplied to the second channel when the difference between the switching timing of the first channel and the switching timing of the second channel is smaller than a first value, wherein the increase is in response to the detection result of the difference detector.

2. The controller according to claim 1, wherein the difference detector is configured to monitor a voltage of a first coupling point and a voltage of a second coupling point, the first coupling point being a coupling point of a first switching element of the first channel and a first output coil, the second coupling point being a coupling point of a second switching element of the second channel and a second output coil, and is configured to detect a difference between a rising timing of the voltage of the first coupling point and a rising timing of the voltage of the second coupling point.

3. The controller according to claim 1, wherein the timing adjuster is configured to decrease the difference between the timing of the clock signal supplied to the first channel and the timing of the clock signal supplied to the second channel when the difference between the switching timing of the first channel and the switching timing of the second channel is larger than a second value, wherein the decrease is in response to the detection result of the difference detector.

4. The controller according to claim 1, wherein the difference detector comprises:
   a first difference detector configured to invert a logic of an output of the first difference detector when the difference between the switching timing of the first channel and the switching timing of the second channel is smaller than the first value;
   a second difference detector configured to invert a logic of an output of the second difference detector when the difference between the switching timing of the first channel and the switching timing of the second channel is larger than the second value; and
   a latch circuit configured to set in accordance with the output of the first difference detector and configured to reset in accordance with the output of the second difference detector.

5. The controller according to claim 4, wherein the first difference detector and the second difference detector comprise:
   a first flip flop configured to latch a first input signal at a rising timing of a voltage of a first coupling point;
   a second flip flop configured to latch a second input signal at a rising timing of a voltage of a second coupling point;
   a constant current source configured to supply constant current of a certain amount;
   a capacitor configured to be charged by the constant current source;
   a first transistor configured to couple the constant current source and the capacitor based on an output of the first flip flop;
   a second transistor configured to discharge an electric charge based on an output of the first flip flop;
   a third transistor configured to control a gate voltage based on a voltage of the capacitor;
   a resistor configured to couple in series to the third transistor; and
   an amplifier configured to receive a voltage of a coupling point of the third transistor and the resistor.

6. The controller according to claim 1, wherein the timing adjuster comprises:
   a delay generator configured to apply a delay to the clock signal supplied to the second channel; and
   a selector configured to selectively output a signal applied with no delay by the delay generator or the signal applied with the delay by the delay generator based on the detection result of the difference detector.

7. The controller according to claim 1, wherein the second channel is a step-up and step-down DC-DC converter.

8. The controller according to claim 1, wherein the difference detector is configured to monitor an internal signal instead of monitoring a voltage of a second coupling point, the internal signal determining, based on a relationship between an input voltage of the input power supply and an output voltage of the second channel, whether the second channel performs step-up operations or step-down operations.

9. The controller according to claim 1, wherein the first channel and the second channel are adjacent channels.

10. An electronic device comprising:
    a switching power supply including a plurality of channels that are coupled in common to an input power supply and perform switching operations in response to clock signals;
    a system to which an output voltage of the switching power supply is supplied; and
    a control circuit configured to control the switching power supply, wherein
    the control circuit comprises:
    a difference detector configured to detect a difference between a switching timing of a first channel of the switching power supply and a switching timing of a second channel of the switching power supply; and
    a timing adjuster configured to increase a difference between a timing of a clock signal supplied to the first channel and a timing of a clock signal supplied to the second channel when the difference between the switching timing of the first channel and the switching timing of the second channel is smaller than a first value, wherein the increase is based on the detection result of the difference detector.

11. The electronic device according to claim 10, wherein the difference detector is configured to monitor a voltage of a first coupling point and a voltage of a second coupling point, the first coupling point being a coupling point of a first switching element of the first channel and a first output coil, the second coupling point being a coupling point of a second switching element of the second channel and a second output coil, and is configured to detect a difference between a rising timing of the voltage of the first coupling point and a rising timing of the voltage of the second coupling point.

12. The electronic device according to claim 10, wherein the timing adjuster is configured to decrease the difference between the timing of the clock signal supplied to the first channel and the timing of the clock signal supplied to the second channel when the difference between the switching timing of the first channel and the switching timing of the second channel is larger than a second value, wherein the decrease is in response to the detection result of the difference detector.

13. The electronic device according to claim 10, wherein the difference detector comprises:
   a first difference detector configured to invert a logic of an output of the first difference detector when the difference between the switching timing of the first channel and the switching timing of the second channel is smaller than the first value;
   a second difference detector configured to invert a logic of an output of the second difference detector when the difference between the switching timing of the first channel and the switching timing of the second channel is larger than the second value; and
   a latch circuit configured to set in accordance with the output of the first difference detector and is configured to reset in accordance with the output of the second difference detector.

14. The electronic device according to claim 13, wherein the first difference detector and the second difference detector comprise:
   a first flip flop configured to latch a first input signal at a rising timing of a voltage of a first coupling point;
   a second flip flop configured to latch a second input signal at a rising timing of a voltage of a second coupling point;
   a constant current source configured to supply constant current of a certain amount;
   a capacitor configured to be charged by the constant current source;
   a first transistor configured to couple the constant current source and the capacitor based on an output of the first flip flop;
   a second transistor configured to discharge an electric charge based on an output of the first flip flop;
   a third transistor configured to control a gate voltage based on a voltage of the capacitor;
   a resistor configured to couple in series to the third transistor; and
   an amplifier configured to receive a voltage of a coupling point of the third transistor and the resistor.

15. The electronic device according to claim 10, wherein the timing adjuster comprises:
   a delay generator configured to apply a delay to the clock signal supplied to the second channel; and
   a selector configured to selectively output a signal applied with no delay by the delay generator or the signal applied with the delay by the delay generator based on the detection result of the difference detector.

16. A method comprising:
   detecting a difference between a switching timing of a first channel of a switching power supply including a plurality of channels, and a switching timing of a second channel of the switching power supply, the plurality of channels being coupled in common to an input power supply, and switching operations in response to clock signals; and
   adjusting timing by increasing a difference between a timing of a clock signal supplied to the first channel and a timing of a clock signal supplied to the second channel when the difference between the switching timing of the first channel and the switching timing of the second channel is smaller than a first value, wherein the increase is based on result of the detected difference.

17. The method of claim 16, wherein detecting a difference is based on a rising time of a voltage of a first coupling point and a rising time of a voltage of a second coupling point, the first coupling point being a coupling point of a first switching element of the first channel and a first output coil, the second coupling point being a coupling point of a second switching element of the second channel and a second output coil.

18. The method of claim 16, further comprising:
   decreasing the difference between the timing of the clock signal supplied to the first channel and the timing of the clock signal supplied to the second channel when the difference between the switching timing of the first channel and the switching timing of the second channel is larger than a second value, wherein the decreasing is based on result of the detected difference.

19. The method of claim 16, wherein detecting the difference comprises:
   inverting a logic of an output of the first difference detector when the difference between the switching timing of the first channel and the switching timing of the second channel is smaller than the first value;
   inverting a logic of an output of the second difference detector when the difference between the switching timing of the first channel and the switching timing of the second channel is larger than the second value; and
   outputting in accordance with the output of the first difference detector and in accordance with the output of the second difference detector.

20. The method of claim 16, wherein adjusting the timing comprises:
   applying a delay to the clock signal supplied to the second channel; and
   selectively outputting a signal applied with no delay or with the delay based on result of the detected difference.

* * * * *